United States Patent
Kalos et al.

(10) Patent No.: US 7,711,924 B2
(45) Date of Patent: May 4, 2010

(54) MANAGING VOLUMES IN VOLUME GROUPS

(75) Inventors: Matthew Joseph Kalos, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/989,953

(22) Filed: Nov. 15, 2004

(65) Prior Publication Data

US 2006/0106998 A1    May 18, 2006

(51) Int. Cl.
 *G06F 12/02*    (2006.01)
(52) U.S. Cl. .................. 711/220; 711/163
(58) Field of Classification Search ........... 711/163, 711/147
 See application file for complete search history.

(56) References Cited

U.S. PATENT DOCUMENTS

| | | | |
|---|---|---|---|
| 4,310,883 A * | 1/1982 | Clifton et al. | 707/205 |
| 5,530,897 A | 6/1996 | Meritt | |
| 6,185,638 B1 | 2/2001 | Beardsley et al. | |
| 6,314,439 B1 | 11/2001 | Bates et al. | |
| 6,622,177 B1 | 9/2003 | Eilert et al. | |
| 6,970,912 B2 * | 11/2005 | Murayama et al. | 709/216 |
| 2001/0020254 A1 | 9/2001 | Blumenau et al. | |
| 2002/0146018 A1 | 10/2002 | Kailamaki et al. | |
| 2003/0126107 A1 * | 7/2003 | Yamagami | 707/1 |
| 2004/0015668 A1 * | 1/2004 | McBrearty et al. | 711/163 |
| 2005/0114591 A1 * | 5/2005 | Coronado et al. | 711/112 |

OTHER PUBLICATIONS

U.S. Appl. No. 10/719,486, Coronado et al, filed Nov. 20, 2003.
U.S. Appl. No. 10/719,488, Cervantes et al, filed Nov. 20, 2003.

* cited by examiner

*Primary Examiner*—Matt Kim
*Assistant Examiner*—Hamdy S Ahmed
(74) *Attorney, Agent, or Firm*—David W. Victor; Konrad Raynes & Victor LLP (57) ABSTRACT

Provided are a method, system, and program for managing volumes in volume groups configured in a storage system. A first set of volumes is assigned to a first volume group and a first host is assigned to the first volume group. A second set of volumes is assigned to a second volume group and a second host is assigned to the second volume group. The first host may only access volumes in the first volume group and the second host may only access volumes in the second volume group, wherein one volume is assigned to both the first and second volume groups to be accessible to both the first and second hosts.

37 Claims, 5 Drawing Sheets

Volume Group Information

FIG. 3

Alias Address Information

MANAGING VOLUMES IN VOLUME GROUPS

BACKGROUND OF THE INVENTION

1. Field of the Invention

The present invention relates to a method, system, and program for managing volumes in volume groups.

2. Description of the Related Art

In certain computing environments, multiple host systems may communicate with one or more control units, such as an IBM Enterprise Storage Server (ESS)®, for data in a storage device managed by the ESS receiving the request. The control unit manages access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit may configure logical volumes that define regions of storage space in the storage devices the control unit manages.

To allow one host to concurrently submit and have pending multiple Input/Output (I/O) requests toward one volume, the control unit may assign alias addresses that point to a volume base address. The hosts may then have multiple I/O requests pending to a volume by using the base and alias addresses for that volume. The control unit may further assign both base volumes to a volume group and associate that volume group with one or more hosts, such that only hosts assigned to the volume group may access volumes whose volume base addresses are assigned to the volume group. Further, a host may only access alias addresses that point to volume base addresses assigned to the volume group to which the host is assigned. Current systems may further restrict the base volume to being in only one volume group.

SUMMARY

Provided are a method, system, and program for managing volumes in volume groups configured in a storage system. A first set of volumes is assigned to a first volume group and a first host is assigned to the first volume group. A second set of volumes is assigned to a second volume group and a second host is assigned to the second volume group. The first host may only access volumes in the first volume group and the second host may only access volumes in the second volume group, wherein one volume is assigned to both the first and second volume groups to be accessible to both the first and second hosts.

DETAILED DESCRIPTION

Figure 1:
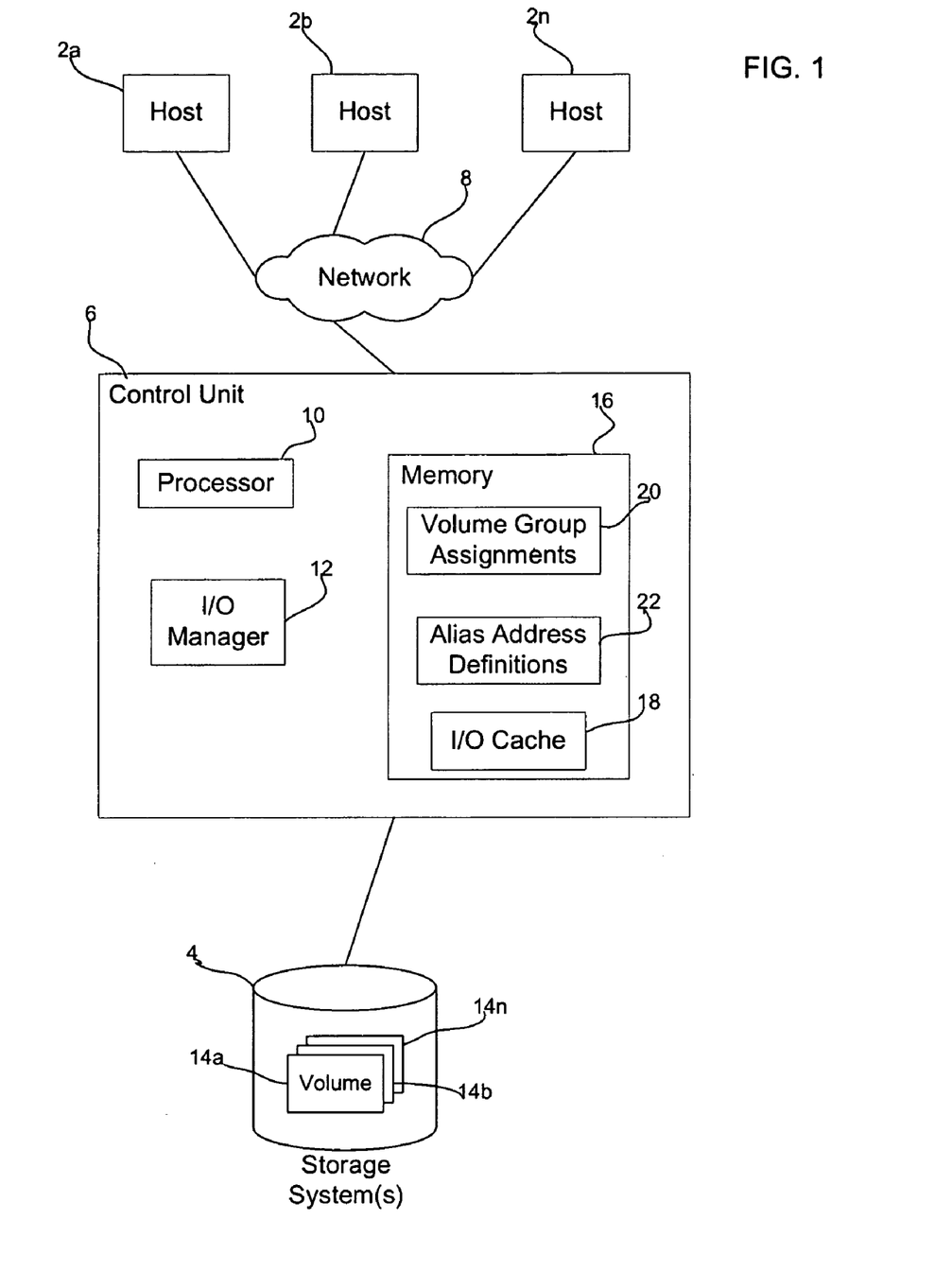
FIG. 1 illustrates an embodiment of a computing environment.

FIG. 1 illustrates an embodiment of a computing environment. Multiple hosts 2a, 2b . . . 2n communicate Input/Output (I/O) requests directed to one or more storage systems 4 (only one is shown) to a control unit 6 over a network 8, where the control unit 6 manages access to the storage system(s) 4. The control unit 6 includes a processor 10 that executes I/O manager code 12 to configure and manage volumes 14a, 14b . . . 14n in the storage system(s) 4. A volume comprises a logical representation of a section of the storage space in the storage systems 4 that may be referenced by the hosts 2a, 2b . . . 2n. The control unit 6 includes a memory 16, such as a non-volatile memory including an I/O cache 18 and information used to manage the configured volumes 14a, 14b . . . 14n, including volume group assignments 20 and alias address definitions 22. The I/O manager code 12 buffers updates and requested data in the I/O cache 18 as the data is being transferred between the hosts 2a, 2b . . . 2n and volumes 14a, 14b . . . 14n.

The hosts 2a, 2b . . . 2n may comprise computing systems capable of communicating I/O requests over a network, such as a server, workstation, desktop, mainframe, laptop, hand held computing device, telephony device, etc. The control unit 6 may comprise a storage server, enterprise storage server, storage controller or other device used to manage I/O requests directed to storage systems 4 managed by the control unit. In one embodiment, the described operations to manage volumes are performed on a zSeries® server host interconnections implemented in a fiber connectivity (FICON) I/O interface. (FICON and zSeries are registered trademarks of International Business Machines (IBM) Corporation). The storage system(s) 4 may include one or more storage devices known in the art, such as interconnected hard disk drives (e.g., configured as a DASD, RAID, JBOD, etc.), magnetic tape drive, electronic memory, etc. The network 8 may comprise a local area network (LAN), storage area network (SAN), the Internet, and Intranet, a wireless network, bus interface, serial or parallel connection, etc.

Figure 2:
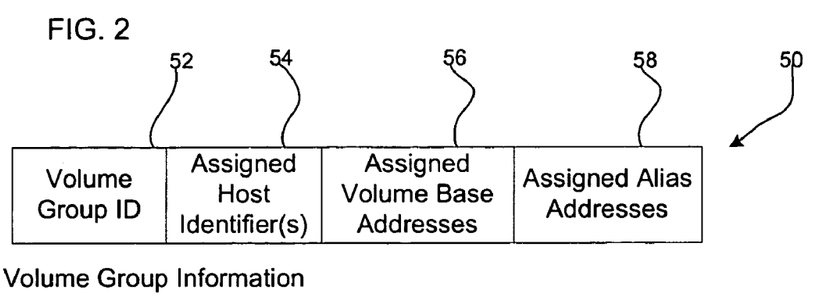
FIG. 2 illustrates an embodiment of volume group information.

FIG. 2 illustrates volume group information 50 included in the volume group assignment 20 for one volume group 50, including: a volume group identifier (ID) 52; an identifier of one or more hosts 54 assigned to the volume group, such as a world wide node name or equivalent identifier; one or more base addresses 56 assigned to the volume group representing volumes assigned to the volume group; and alias addresses 58 assigned to the volume group 58, which may point to volume base addresses assigned to the volume group.

Figure 3:
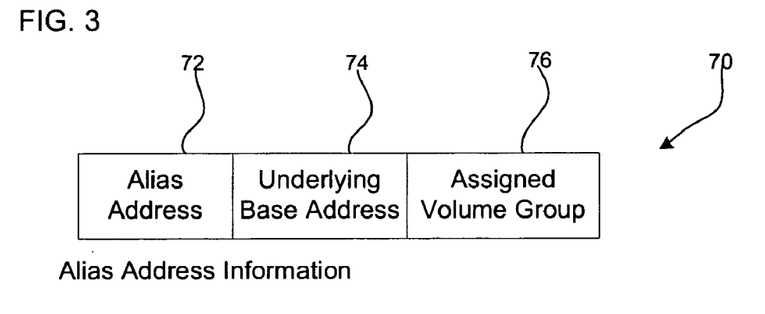
FIG. 3 illustrates an embodiment of alias address information.

FIG. 3 illustrates alias address information 70 included in the alias address definitions 22, including: an alias address 72; the underlying base address 74 to which the alias address points; and one volume group 76 to which the alias address is assigned. Hosts assigned to the volume group to which an alias address is assigned may use the alias address to direct I/O requests to the volume base address to which the alias address points. In this way, a host may concurrently submit and have pending multiple I/O requests to one volume using the volume base address and the one or more alias addresses pointing to that volume base address.

Figure 4:
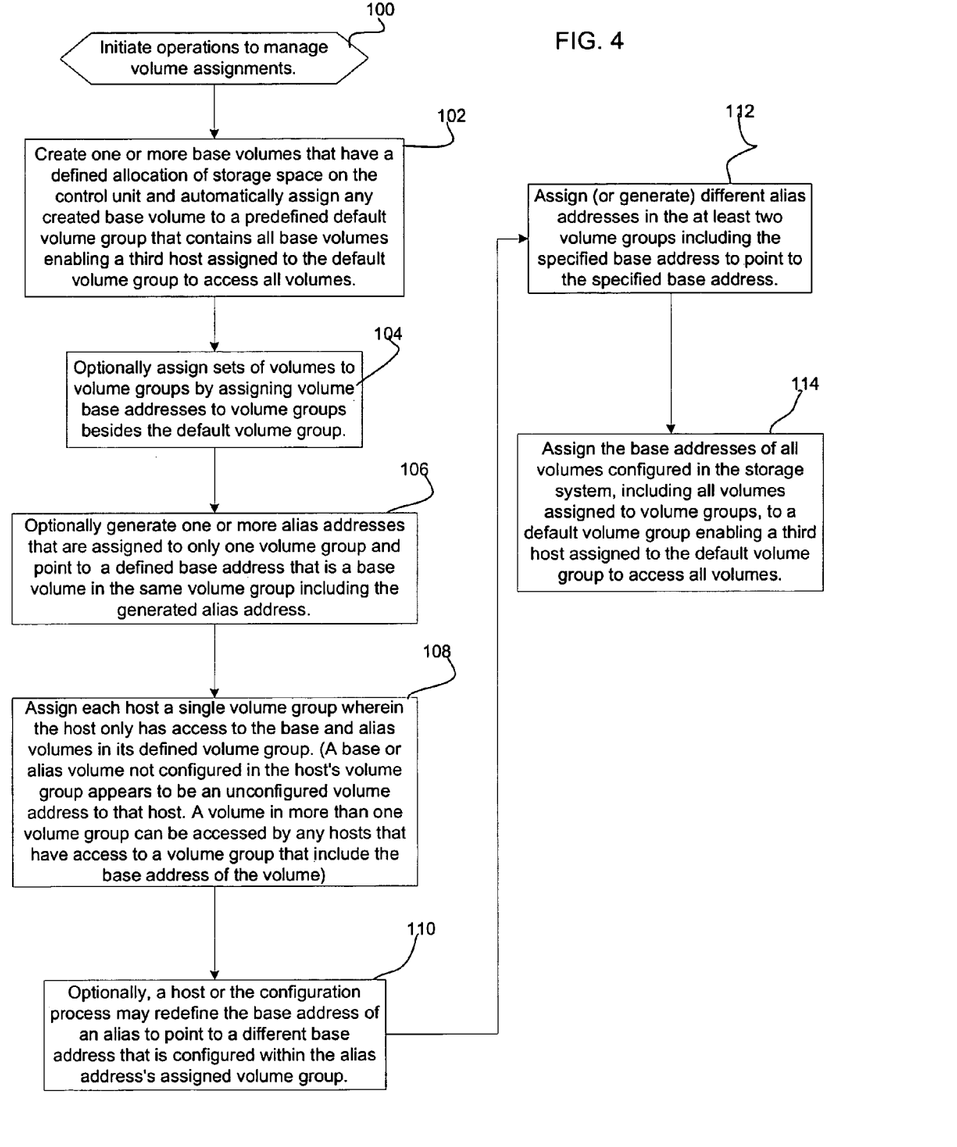
FIGS. 4 and 5 illustrate an embodiment of operations to manage volumes in volume groups.

FIG. 4 illustrates operations performed by the I/O manager 12 to configure and manage volumes and volume groups. The I/O manager 12 initiates (at block 100) the volume configuration and management operations in response to commands submitted by a user of the control unit 6 or one host 2a, 2b . . . 2n authorized to configure volume groups via a command line interface or a graphical user interface (GUI). The I/O manager 12 creates (at block 102) one or more base volumes that have a defined allocation of storage space on the control unit 6 and automatically assigns any created base volumes to a predefined default volume group that contains all base volumes. The I/O manager 12 optionally assigns (at block 104) sets of volumes to volume groups by assigning volume base addresses to volume groups besides the default volume group.

The I/O manager 12 may also generate (at block 106) at least one alias address that is assigned to only one volume group and that points to a defined base address that is a base volume in the same volume group including the generated alias address. Each host is assigned (at block 108) a single volume group wherein the host 2a, 2b . . . 2n only has access to the base and alias volumes in its defined volume group. (A base or alias volume not configured in the host's volume group appears to be an unconfigured volume address to that host. A volume in more than one volume group can be accessed by any hosts that have access to a volume group including the base address).

A host or the configuration process may redefine (at block 110) the base address of an alias to point to a different base address that is configured within the alias address's assigned volume group. In embodiments where a host only has access to a single volume group and the aliases in that volume group can only be configured to base volumes configured to the volume group, the alias address cannot be used to access base volumes that are not assigned to the volume group. This constraint supports aliases to be used to access base volumes in the volume group that are dedicated (assigned to only this volume group) or shared (assigned to this volume group and other volume groups) without allowing them to access base volumes that are not configured to the host's volume group. The I/O manager 12 assigns (or generates) (at block 112) different alias addresses in the at least two volume groups including the specified base address to point to the specified base address. Further, the base addresses of all volumes configured in the storage system, including all volumes assigned to volume groups, may be assigned (at block 114) to a default volume group enabling a third host assigned to the default volume group to access all volumes. In embodiments where there is a default volume group, the administrator or storage resource provider may always keep a volume base address assigned to the default volume group, although volume base addresses may be removed from a client volume group as part of the storage resource management.

In one embodiment, the assigned alias address may not be assigned to a volume base address in another volume group and hosts only use aliases addresses assigned to the volume group to which the host is assigned. Alias address information 70 (FIG. 3) would be created for the generated alias address identifying the alias address 72, the volume base address 74 to which the alias address 72 points and the assigned volume group 76 including the volume base address pointed to by the generated base alias. The I/O manager 12 may generate alias addresses when initially configuring a volume or in response to a request from a host 2a, 2b . . . 2n for additional alias addresses. The hosts 2a, 2b . . . 2n may request reassignment of the base addresses of the aliases they can access if the size of their I/O queues for a volume or time I/O requests remain queued exceeds certain performance thresholds.

Further, in the embodiment where the I/O manager 12 assigns (at block 114) the base addresses of all volumes 14a, 14b . . . 14n configured in the storage system(s) 4 to a default volume group, a third or additional host assigned to the default volume group may access all volumes. Volumes assigned to the default volume group may be assigned to other volume groups to enable access to other hosts not assigned to the default volume group. In one embodiment, the hosts, such as first and second hosts, assigned to volume groups may be owned by separate organizations, such as companies, user groups, individual users, etc., that are clients of a storage resource provider, e.g., storage farm. In such case, the storage resource provider uses the host assigned to the default volume group to manage all volumes assigned to different client volume groups. This allows the storage resource provider to create, modify and delete volume groups and the volume base and alias addresses assigned to volume groups through managing the default volume group.

Figure 5:
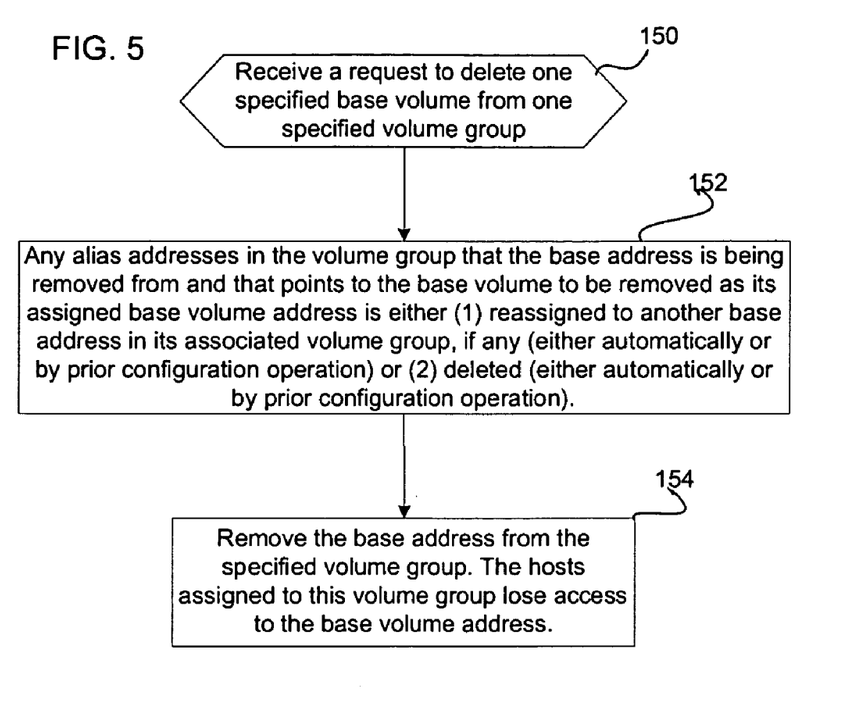

FIG. 5 illustrates operations performed by the I/O manager 12 to remove one specified base volume from one volume group. This request may be received by the administrator of the control unit 6 managing the volume groups. Upon receiving (at block 150) a request to delete one specified volume 14a,14b . . . 14n identified by a base volume address from one specified volume group, the I/O manager 12 performs (at block 152) one of the following two operations with respect to any alias addresses in the volume group that the base address is being removed from and that points to the base volume to be removed: (1) reassign the alias address to another base address in its associated volume group, if any (either automatically or by prior configuration operation) or (2) delete the alias address (either automatically or by prior configuration operation). The I/O manager 12 then removes (at block 154) the base address from the specified volume group. The hosts assigned to this volume group lose access to the deleted base volume address.

Figure 6:
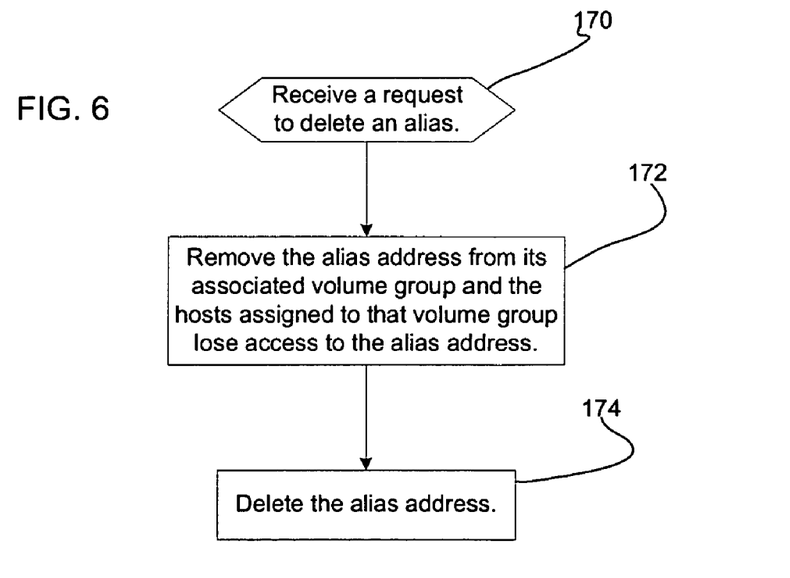
FIG. 6 illustrates an embodiment of operations performed by the I/O manager to delete an alias address.

FIG. 6 illustrates operations performed by the I/O manager 12 to delete an alias address. Upon receiving (at block 170) a request to delete an alias address, the I/O manager 12 removes (at block 172) the alias address from its associated volume group and the hosts assigned to that volume group lose access to the alias address. The alias address is then deleted (at block 174).

Figure 7:
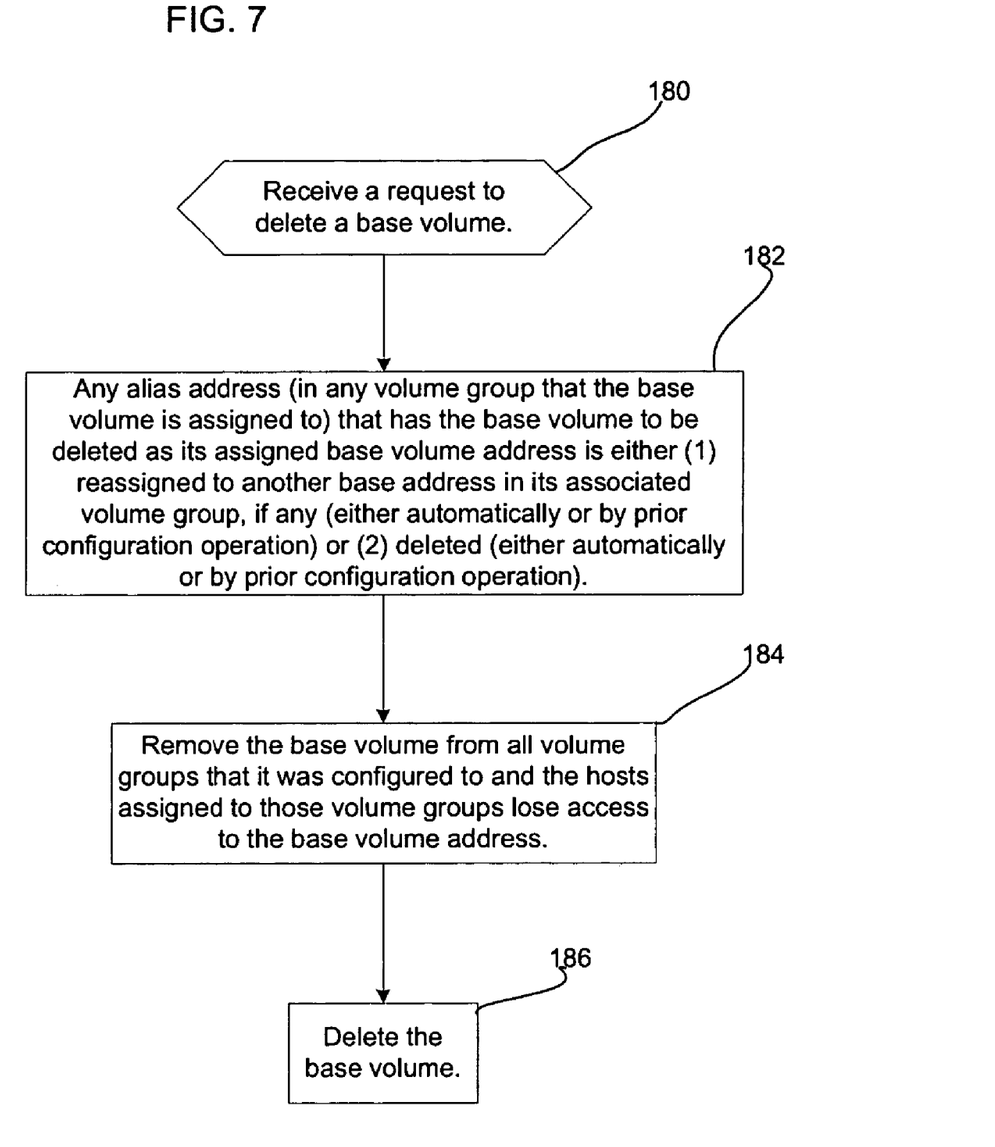
FIG. 7 illustrates an embodiment of operations performed by the I/O manager to delete a base volume.

FIG. 7 illustrates operations performed by the I/O manager 12 to delete a base volume. Upon receiving a request to delete (at block 180) a base volume, with respect to any alias address (in any volume group that the base volume is assigned to) that has the base volume to be deleted as its assigned base volume address, the I/O manager 12 performs (at block 182) either (1) reassigning the alias address to another base address in its associated volume group, if any (either automatically or by prior configuration operation) or (2) deleting the alias address (either automatically or by prior configuration operation). The base volume is removed (at block 184) from all volume groups that it was configured to and the hosts assigned to those volume groups lose access to the base volume address. The base volume is then deleted (at block 186).

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The reference letter "n" is used to refer to an instance number of an element, e.g., hosts 2a, 2b . . . 2n, volumes 14a, 14b . . . 14n, and may indicate a different or same number of elements in different usages. For instance the number of hosts 2n may differ from the number of volumes 14n.

FIGS. 2 and 3 show certain information included in volume group information and alias address information. In alternative embodiments, this information may be stored in different data structures having different formats and information than shown. For instance, there may be a separate data structure associating hosts with the volume groups to which they are assigned.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIGS. 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing hosts access to volumes configured in a storage system, comprising:
   assigning a first set of volumes to a first volume group;
   assigning a first host to the first volume group;
   assigning a second set of volumes to a second volume group;
   assigning a second host to the second volume group, wherein the first host only accesses volumes in the first volume group and the second host only accesses volumes in the second volume group, wherein one volume in both the first and second volume groups is accessible to both the first and second hosts while the volume is assigned to both the first and second volume groups, wherein each volume in the first and second volume groups has a base address, wherein the volume base addresses are assigned to the volume groups to which the volumes are assigned;
   defining at least one alias address that points to one base address to enable one host to concurrently submit multiple Input/Output (I/O) requests to one volume using the base address and the at least one alias address pointing to that base address; and
   assigning each alias address to the volume group including the base address to which the alias address points in response to generating the alias address, and wherein hosts only have access to the alias addresses in the volume group to which the host is assigned.

2. The method of claim 1, wherein the host is identified such that the identification of the host is used to assign the host to one volume group in a volume group definition.

3. The method of claim 1,
   wherein the assigned alias address may not be assigned to a base address in another volume group.

4. The method of claim 1, further comprising:
   assigning one specified base address for one volume to at least two volume groups; and
   assigning different alias addresses in the at least two volume groups including the specified base address to point to the specified base address, wherein the alias addresses are not assigned to base volumes outside of the volume group to which the alias is assigned.

5. The method of claim 1, further comprising:
   modifying one alias address in a specified volume group to point to a different base address in the specified volume group, wherein the alias address assigned to one volume group cannot be modified to point to one base address in a different volume group.

6. The method of claim 1, further comprising:
   receiving a request to delete one specified base volume from one specified volume group;
   modifying at least one alias address pointing to the specified base volume to delete so that there are no alias addresses in the specified volume group pointing to the specified base address to delete in response to receiving the request to delete the base volume; and
   deleting the base address from the specified volume group in response to modifying the at least one alias address.

7. The method of claim 1, wherein modifying the at least one alias address comprises either reassigning the alias address to another base address associated with the specified volume group or deleting the alias address.

8. The method of claim 1, further comprising:
   assigning the base addresses of all volumes configured in the storage system, including volumes in the first and second sets, to a default volume group enabling a third host assigned to the default volume group to access all volumes, wherein volumes assigned to the default volume group are capable of being assigned to other volume groups to enable access to other hosts not assigned to the default volume group.

9. The method of claim 8, wherein the first and second hosts are owned by separate organizations that are clients of a storage resource provider, wherein the storage resource provider uses the third host assigned to the default volume group to manage all volumes assigned to different client volume groups.

10. The method of claim 1, further comprising:
    assigning multiple hosts to one specified volume group, wherein the hosts assigned to the specified volume group are enabled to share all base and alias addresses assigned to the specified volume group.

11. The method of claim 1, further comprising:
receiving a request to delete a specified alias address from a specified volume group;
removing the specified alias address from the specified volume group to which the specified alias address is assigned, wherein hosts assigned to the specified volume group lose access to the alias address; and
deleting the specified alias address in response to removing the specified alias address from the specified volume group.

12. The method of claim 1, further comprising:
receiving a request to delete a specified base volume;
determining alias addresses in the volume group including the specified base volumes that point to the specified base volume;
modifying each determined alias address to point to another base volume address in the volume group in which the determined alias address and specified base volume are included; and
deleting the specified base volume in response to modifying the determined alias addresses.

13. A method for deploying computing instructions, comprising integrating computer-readable code into a system accessible to volumes configured in a storage system, wherein the code is executed by the system to perform operations comprising:
assigning a first set of volumes to a first volume group;
assigning a first host to the first volume group;
assigning a second set of volumes to a second volume group;
assigning a second host to the second volume group, wherein the first host may only access volumes in the first volume group and the second host may only access volumes in the second volume group, wherein one volume in both the first and second volume groups is accessible to both the first and second hosts while the volume is assigned to both the first and second volume groups, wherein each volume in the first and second volume groups has a base address, wherein the volume base addresses are assigned to the volume groups to which the volumes are assigned;
defining at least one alias address that points to one base address to enable one host to concurrently submit multiple Input/Output (I/O) requests to one volume using the base address and the at least one alias address pointing to that base address; and
assigning each alias address to the volume group including the base address to which the alias address points in response to generating the alias address, and wherein hosts only have access to the alias addresses in the volume group to which the host is assigned.

14. A system in connection with hosts and volumes configured in a storage system, comprising:
a processor; and
a computer readable storage medium including code executed by the processor to perform operations, the operations comprising:
assigning a first set of volumes to a first volume group;
assigning a first host to the first volume group;
assigning a second set of volumes to a second volume group;
assigning a second host to the second volume group, wherein the first host only accesses volumes in the first volume group and the second host only accesses volumes in the second volume group, wherein one volume in both the first and second volume groups is accessible to both the first and second hosts while the volume is assigned to both the first and second volume groups, wherein each volume in the first and second volume groups has a base address, wherein the volume base addresses are assigned to the volume groups to which the volumes are assigned;
defining at least one alias address that points to one base address to enable one host to concurrently submit multiple Input/Output (I/O) requests to one volume using the base address and the at least one alias address pointing to that base address; and
assigning each alias address to the volume group including the base address to which the alias address points in response to generating the alias address, and wherein hosts only have access to the alias addresses in the volume group to which the host is assigned.

15. The system of claim 14, wherein the host is identified such that the identification of the host is used to assign the host to one volume group in a volume group definition.

16. The system of claim 14, wherein the assigned alias address may not be assigned to a base address in another volume group.

17. The system of claim 14, wherein the operations further comprise:
assigning one specified base address for one volume to at least two volume groups; and
assigning different alias addresses in the at least two volume groups including the specified base address to point to the specified base address, wherein the alias addresses are not assigned to base volumes outside of the volume group to which the alias is assigned.

18. The system of claim 14, wherein the operations further comprise:
modifying one alias address in a specified volume group to point to a different base address in the specified volume group, wherein the alias address assigned to one volume group cannot be modified to point to one base address in a different volume group.

19. The system of claim 14, wherein the operations further comprise:
receiving a request to delete one specified base volume from one specified volume group;
modifying at least one alias address pointing to the specified base volume to delete so that there are no alias addresses in the specified volume group pointing to the specified base address to delete in response to receiving the request to delete the base volume; and
deleting the base address from the specified volume group in response to modifying the at least one alias address.

20. The system of claim 14, wherein modifying the at least one alias address comprises either reassigning the alias address to another base address associated with the specified volume group or deleting the alias address.

21. The system of claim 14, wherein the operations further comprise:
assigning the base addresses of all volumes configured in the storage system, including volumes in the first and second sets, to a default volume group enabling a third host assigned to the default volume group to access all volumes, wherein volumes assigned to the default volume group are capable of being assigned to other volume groups to enable access to other hosts not assigned to the default volume group.

22. The system of claim 21, wherein the first and second hosts are owned by separate organizations that are clients of a storage resource provider, wherein the storage resource provider uses the third host assigned to the default volume group to manage all volumes assigned to different client volume groups.

23. The system of claim 14, wherein the operations further comprise:
assigning multiple hosts to one specified volume group, wherein the hosts assigned to the specified volume group are enabled to share all base and alias addresses assigned to the specified volume group.

24. The system of claim 14, wherein the operations further comprise:
receiving a request to delete a specified alias address from a specified volume group;
removing the specified alias address from the specified volume group to which the specified alias address is assigned, wherein hosts assigned to the specified volume group lose access to the alias address; and
deleting the specified alias address in response to removing the specified alias address from the specified volume group.

25. The system of claim 14, wherein the operations further comprise:
receiving a request to delete a specified base volume;
determining alias addresses in the volume group including the specified base volumes that point to the specified base volume;
modifying each determined alias address to point to another base volume address in the volume group in which the determined alias address and specified base volume are included; and
deleting the specified base volume in response to modifying the determined alias addresses.

26. An article of manufacture comprising a computer readable storage medium having code executed to provide hosts access to volumes configured in a storage system, wherein the article of manufacture is enabled to perform operations, the operations comprising:
assigning a first set of volumes to a first volume group;
assigning a first host to the first volume group;
assigning a second set of volumes to a second volume group;
assigning a second host to the second volume group, wherein the first host only accesses volumes in the first volume group and the second host only accesses volumes in the second volume group, wherein one volume in both the first and second volume groups is accessible to both the first and second hosts while the volume is assigned to both the first and second volume groups, wherein each volume in the first and second volume groups has a base address, wherein the volume base addresses are assigned to the volume groups to which the volumes are assigned;
defining at least one alias address that points to one base address to enable one host to concurrently submit multiple Input/Output (I/O) requests to one volume using the base address and the at least one alias address pointing to that base address; and
assigning each alias address to the volume group including the base address to which the alias address points in response to generating the alias address, and wherein hosts only have access to the alias addresses in the volume group to which the host is assigned.

27. The article of manufacture of claim 26, wherein the host is identified such that the identification of the host is used to assign the host to one volume group in a volume group definition.

28. The article of manufacture of claim 26, wherein the assigned alias address may not be assigned to a base address in another volume group.

29. The article of manufacture of claim 26, wherein the operations further comprise:
assigning one specified base address for one volume to at least two volume groups; and
assigning different alias addresses in the at least two volume groups including the specified base address to point to the specified base address, wherein the alias addresses are not assigned to base volumes outside of the volume group to which the alias is assigned.

30. The article of manufacture of claim 26, wherein the operations further comprise:
modifying one alias address in a specified volume group to point to a different base address in the specified volume group, wherein the alias address assigned to one volume group cannot be modified to point to one base address in a different volume group.

31. The article of manufacture of claim 26, wherein the operations further comprise:
receiving a request to delete one specified base volume from one specified volume group;
modifying at least one alias address pointing to the specified base volume to delete so that there are no alias addresses in the specified volume group pointing to the specified base address to delete in response to receiving the request to delete the base volume; and
deleting the base address from the specified volume group in response to modifying the at least one alias address.

32. The article of manufacture of claim 26, wherein modifying the at least one alias address comprises either reassigning the alias address to another base address associated with the specified volume group or deleting the alias address.

33. The article of manufacture of claim 26, wherein the operations further comprise:
assigning the base addresses of all volumes configured in the storage system, including volumes in the first and second sets, to a default volume group enabling a third host assigned to the default volume group to access all volumes, wherein volumes assigned to the default volume group are capable of being assigned to other volume groups to enable access to other hosts not assigned to the default volume group.

34. The article of manufacture of claim 33, wherein the first and second hosts are owned by separate organizations that are clients of a storage resource provider, wherein the storage resource provider uses the third host assigned to the default volume group to manage all volumes assigned to different client volume groups.

35. The article of manufacture of claim 26, wherein the operations further comprise:
assigning multiple hosts to one specified volume group, wherein the hosts assigned to the specified volume group are enabled to share all base and alias addresses assigned to the specified volume group.

36. The article of manufacture of claim 26, wherein the operations further comprise:
receiving a request to delete a specified alias address from a specified volume group;
removing the specified alias address from the specified volume group to which the specified alias address is assigned, wherein hosts assigned to the specified volume group lose access to the alias address; and deleting the specified alias address in response to removing the specified alias address from the specified volume group.

37. The article of manufacture of claim 26, wherein the operations further comprise:

receiving a request to delete a specified base volume;

determining alias addresses in the volume group including the specified base volumes that point to the specified base volume;

modifying each determined alias address to point to another base volume address in the volume group in which the determined alias address and specified base volume are included; and deleting the specified base volume in response to modifying the determined alias addresses.

* * * * *